United States Patent

Okuno

(10) Patent No.: US 9,405,044 B2
(45) Date of Patent: Aug. 2, 2016

(54) ANTIREFLECTION COATING FILM, AND OPTICAL ELEMENT, OPTICAL SYSTEM, AND OPTICAL APPARATUS HAVING THE SAME

(71) Applicant: CANON KABUSHIKI KAISHA, Tokyo (JP)

(72) Inventor: Takeharu Okuno, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 13/913,962

(22) Filed: Jun. 10, 2013

(65) Prior Publication Data

US 2013/0329295 A1   Dec. 12, 2013

(30) Foreign Application Priority Data

Jun. 12, 2012 (JP) .................................. 2012-132760

(51) Int. Cl.
*G02B 1/11* (2015.01)
*G02B 1/116* (2015.01)
*G02B 1/118* (2015.01)

(52) U.S. Cl.
CPC ...... *G02B 1/11* (2013.01); *G02B 1/116* (2013.01); *G02B 1/118* (2013.01)

(58) Field of Classification Search
CPC ............ G02B 1/10; G02B 1/11; G02B 1/111; G02B 1/113; G02B 1/115; G02B 1/118; G02B 2207/107; G02B 5/28; G02B 5/285; G02B 5/286
USPC ................. 359/577, 580, 581, 586, 599, 601; 257/437; 349/137, 64, 112; 438/72, 438/636, 952; 362/235, 244, 246, 311.01, 362/317, 326, 351, 355
See application file for complete search history.

(56) References Cited

U.S. PATENT DOCUMENTS

| | | | | |
|---|---|---|---|---|
| 3,854,796 | A * | 12/1974 | Thelen | C03C 17/3417 359/588 |
| 4,590,117 | A * | 5/1986 | Taniguchi et al. | 428/212 |
| 7,771,832 | B2 * | 8/2010 | Nakayama | C03C 1/006 428/336 |
| 2005/0225878 | A1 | 10/2005 | Tanaka et al. | |
| 2009/0081361 | A1 * | 3/2009 | Yamada et al. | 427/162 |
| 2009/0135491 | A1 * | 5/2009 | Endoh | G02B 3/0012 359/601 |
| 2011/0128629 | A1 * | 6/2011 | Takahashi | G02B 27/0006 359/601 |

FOREIGN PATENT DOCUMENTS

| | | |
|---|---|---|
| JP | 2006259711 A | 9/2006 |
| JP | 2008-58438 A | 3/2008 |
| JP | 2010-55060 A | 3/2010 |
| JP | 2010-78803 A | 4/2010 |
| JP | 2010186198 A | 8/2010 |
| JP | 2011090225 A | 5/2011 |
| JP | 2012008524 A | 1/2012 |

* cited by examiner

*Primary Examiner* — Stephone B Allen
*Assistant Examiner* — Adam W Booher
(74) *Attorney, Agent, or Firm* — Canon U.S.A., Inc., IP Division (57) ABSTRACT

An antireflection coating film formed on an optical base member includes: a first layer having a refractive index of N1 and a film thickness of D1; a second layer having a refractive index of N2 and a film thickness of D2; and a third layer formed of a fine concavo-convex structure, having a refractive index changing from N3 to 1.0, and a film thickness of D3, wherein the first, second, and third layer are formed in order from the optical base member side having a refractive index of Nsub, and wherein when the refractive indexes Nsub, N1, N2, and N3 are those taken when a wavelength is 550 nm, conditions for Nsub, N1, D1, N2, D2, N3 and D3 are satisfied.

19 Claims, 10 Drawing Sheets

ANTIREFLECTION COATING FILM, AND OPTICAL ELEMENT, OPTICAL SYSTEM, AND OPTICAL APPARATUS HAVING THE SAME

BACKGROUND OF THE INVENTION

1. Field of the Invention

The present invention relates to an antireflection coating film formed on an optical base member such as a lens, for example, and an optical element, an optical system, an optical apparatus having the same.

2. Description of the Related Art

In the related art, antireflection measures are taken for reducing light quantity loss of an incident light on a surface of a lens. For example, as one of the antireflection measures for optical elements for visible light, a dielectric multilayer film referred generally to as a multi-coat is widely used. The dielectric multilayer film is configured to reduce reflected light by laminating thin films having different refractive indexes and having adequate film thickness, adjusting amplitudes and phases of reflected waves generated at surfaces and interfaces of the respective films and causing the reflected waves to interfere with each other. Therefore, superior antireflection performances with respect to light rays having specific wavelengths and incident angles are achieved. However, as regards other light rays, interference conditions are not fulfilled, it is difficult to achieve high antireflection performances over a wide wavelength band range or a wide incident angle range.

In contrast, in digital cameras being in widespread use in recent years, image sensors such as CCD or CMOS having higher reflectance in comparison with silver-halide film of the related art are used. Therefore, specific undesirable light, referred to as "digital ghost" caused by light reflected from a sensor surface reflects again on the lens surface, and reaches the sensor surface again may often occur.

In addition, as the lenses for the digital cameras, anomalous dispersion glasses, aspherical lenses, the lenses having large curvatures tend to be used in order to achieve both high image quality and high specifications (such as zoom magnification or brightness) and portability (being compact and light weight). Among these lenses, the lenses having the large curvatures cause light rays incident at large angles in a periphery thereof, and hence the dielectric multilayer film of the related art is not enough to reduce the reflection. Consequently, the undesirable light which deteriorates a quality of shot images such as flare and ghost may occur.

In view of such circumstances, development of a high performance antireflection coating film superior in wavelength band range characteristics, and incident angle characteristics in comparison with the dielectric multilayer film is required. U.S. Patent Application Publication No. 2005/0225878 discloses an antireflection coating film formed with a magnesium fluoride layer by a sol-gel method on a dielectric thin film including three layers formed by using a vacuum vapor deposition method, and that superior antireflection characteristics are achieved by adequately setting the refractive indexes and film thicknesses of the layers from a first layer to a fourth layer.

However, in the antireflection coating film disclosed in above-described U.S. Patent Application Publication No. 2005/0225878, the reflectance of the light ray having a wavelength of 550 nm and the indicant angle of 0° has a value on the order of 0.4%, which cannot be said to bring out sufficient antireflection performances. Also, the reflectance of the light ray having a wavelength of 550 nm and an indicant angle of 60° has a value on the order of 2%, which cannot be said to bring out sufficient incident angle characteristics.

SUMMARY OF THE INVENTION

The present invention provides an antireflection coating film superior in incident angle characteristics over a wide wavelength band range such as an entire visible wavelength range, and an optical element, an optical system, and an optical apparatus having the same.

The invention provides an antireflection coating film formed on an optical base member including: a first layer having a refractive index of N1 and a film thickness of D1; a second layer having a refractive index of N2 and a film thickness of D2; and a third layer formed of a fine concavo-convex structure, having a refractive index changing from N3 to 1.0, and a film thickness of D3, wherein the first, second, and third layer are formed in order from the optical base member side having a refractive index of Nsub, and wherein when the refractive indexes Nsub, N1, N2, and N3 are those taken when a wavelength is 550 nm, the following conditions are satisfied;

$1.43 \leq Nsub \leq 1.65$ $1.30 \leq N1 \leq 1.50$ $22 \text{ nm} \leq D1 \leq 45 \text{ nm}$ $1.42 \leq N2 \leq 1.52$ $18 \text{ nm} \leq D2 \leq 35 \text{ nm}$ $1.35 \leq N3 \leq 1.52$ $180 \text{ nm} \leq D3 \leq 320 \text{ nm}$ $N1 \leq Nsub$ $N1 \leq N2$ $N3 \leq N2$.

Further features of the present invention will become apparent from the following description of exemplary embodiments with reference to the attached drawings.

DESCRIPTION OF THE EMBODIMENTS

Figure 1:
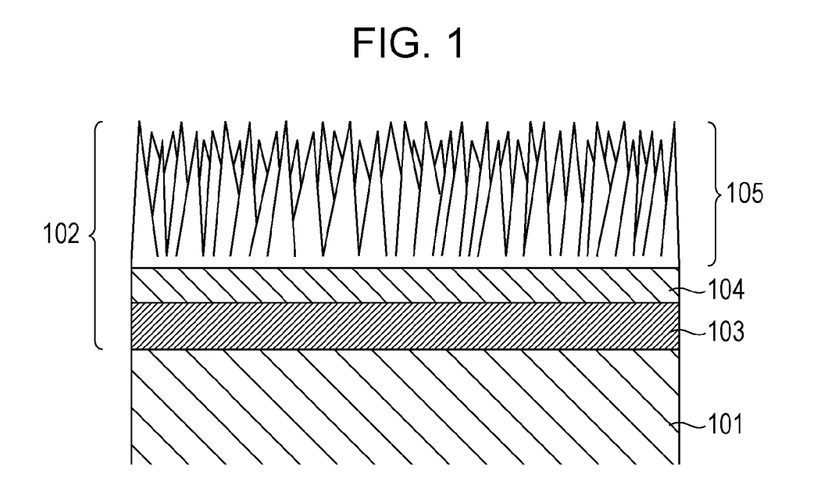
FIG. 1 is a schematic cross-sectional view of an antireflection coating film of the invention.
Figure 2:
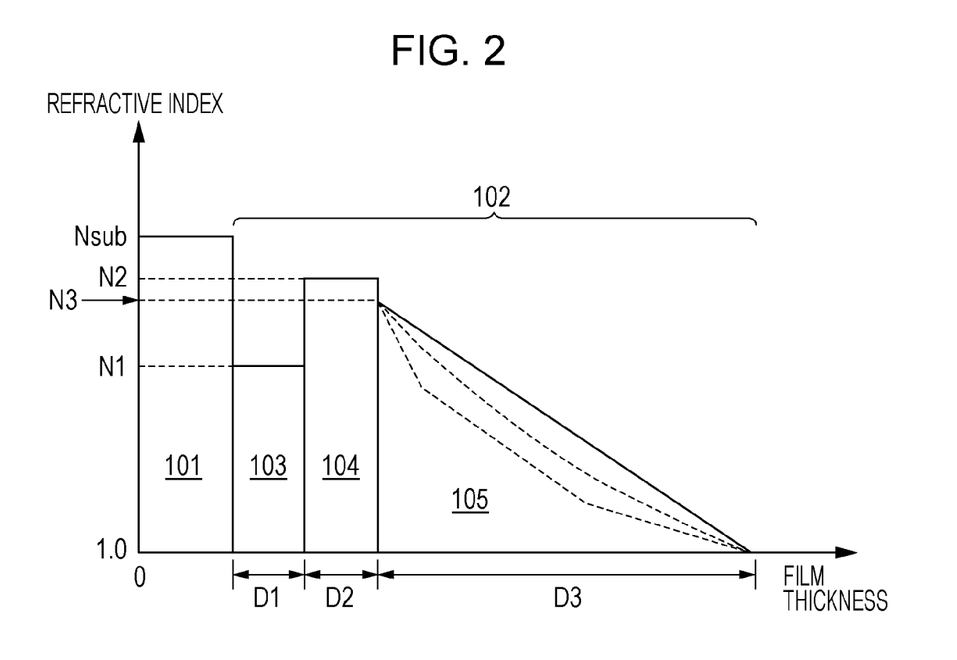
FIG. 2 is a schematic drawing illustrating a refractive index structure of the antireflection coating film of the invention.

The embodiment of the invention will be described with reference to attached drawings. All of values of refractive indexes in the description are on the basis of a wavelength of 550 nm. FIG. 1 is a pattern diagram illustrating a cross section of an antireflection coating film of the invention and FIG. 2 schematically illustrates a refractive index structure of the antireflection coating film of the invention.

FIG. 1 illustrates a portion in the vicinity of a surface of an optical element to which the antireflection coating film of the invention is applied on an optical base member such as a lens or the like in an enlarged scale. An optical base member 101 has a value of a refractive index Nsub between 1.43 and 1.65. An antireflection coating film 102 includes three layers formed in sequence from the side of the optical base member, that is, a first layer 103 formed on the optical base member 101 and a second layer 104 formed on the first layer 103, and a third layer 105 formed on the second layer 104.

The first layer 103 formed on the optical base member 101 has a value of a refractive index N1 between 1.30 and 1.50, and a value of a film thickness D1 between 22 and 45 nm. Then, the second layer 104 formed on the first layer 103 is formed of a material different from the first layer 103, has a value of a refractive index N2 between 1.42 and 1.52, and a value of a film thickness D2 between 18 and 35 nm. The third layer 105 formed on the second layer 104 includes a region having a value of a film thickness D3 between 180 and 320 nm, and substantially continuously changing in a refractive index N3 from a value in a range between 1.35 and 1.52 to 1.0 (air). Here, the expression "substantially continuously changing" means that the refractive index of the material of the film itself is not continuously changing, and that "an effective refractive index" is changed by a continuous change of a space filing factor of a fine concavo-convex structure having an average pitch of 400 nm or smaller. In other words, a light has properties not recognizing a concavo-convex structure having a depth equal to or smaller than the wavelength of itself, but recognizing the same as a medium for the effective refractive index.

In FIG. 1, the fine concavo-convex structure is not a complete periodic structure, but is a structure having random properties. In such a case as well, undesirable light such as diffraction light or scattering light may not occur if each of pitches is smaller than a usable minimum wavelength. In FIG. 1, the case where the fine concavo-convex structure has a random structure has been described in FIG. 1. However, the invention is not limited thereto, and may have a periodic structure. An effective refractive index Neff may be obtained by a Lorentz-Lorenz expression, $$(Neff^2-1)/(Neff^2+2)=f\!f(Nm^2-1)/(Nm^2+2)$$

where Nm is the refractive index of the material which forms the concavo-convex shape having a depth equal to or smaller than the wavelength of itself, and ff is the space filling factor of the corresponding material. In other words, by forming a structure in which the space filling factor changes continuously by pitches equal to or smaller than the wavelength, a film that changes in the refractive index substantially continuously may be formed.

FIG. 2 illustrates a case (solid line) where the third layer 105 is changed linearly from the refractive index N3 at the interface with respect to the second layer 104 toward 1.0 (air). However, the way of changing is not limited thereto, and any change is applicable as long as it changes continuously. For example, as illustrated in two broken lines as examples, a change having a plurality of the regions having different changing rates or a curved change is also applicable.

With such a refractive index structure, the antireflection coating film of the invention is capable of achieving superior antireflection characteristics in a wide wavelength band range over an entire visible wavelength range (wavelengths from 400 to 700 nm) and over a large incident angle range from 0 to 60°. Then, by using the optical element formed with the antireflection coating film of the invention in an optical system, a high-quality optical system in which generation of the undesirable light such as flare or ghost is sufficiently reduced is achieved.

Embodiment 1

Figure 3:
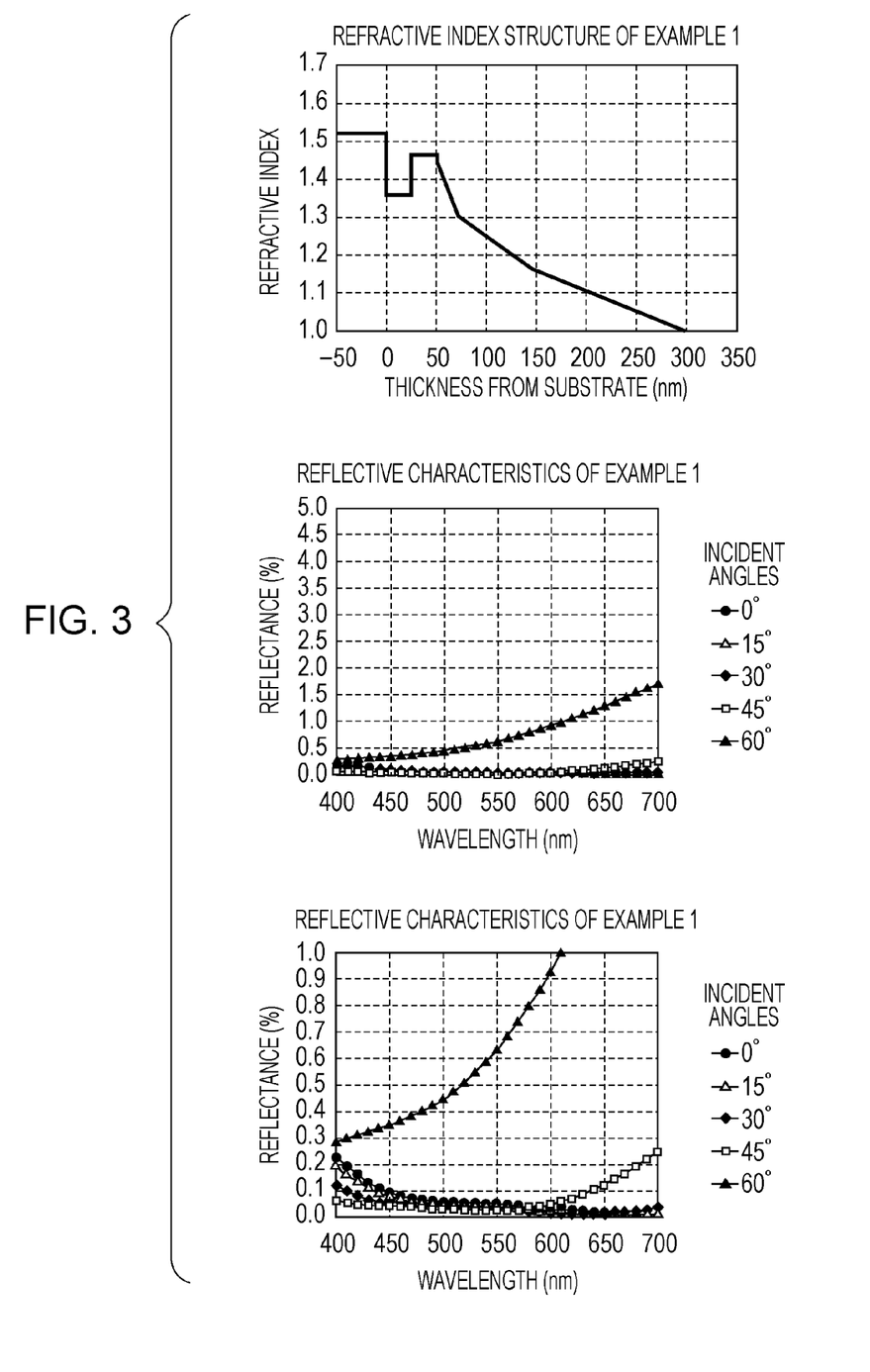
FIG. 3 illustrates the refractive index structure and reflectance characteristics of the antireflection coating film of Embodiment 1.

An upper graph in FIG. 3 illustrates a refractive index structure of an antireflection coating film of the invention. The refractive index Nsub of the optical base member 101 in this example is 1.518. The refractive index N1 of the first layer 103 is 1.360, and the film thickness D1 is 26.0 nm. The refractive index N2 of the second layer 104 is 1.464, and the film thickness D2 is 24.4 nm. The film thickness D3 of the third layer 105 is 248.4 nm, and the refractive index N3 changes continuously from 1.444 toward 1.0 in a profile illustrated in the upper graph in FIG. 3.

A middle graph in FIG. 3 and a lower graph in FIG. 3 illustrate reflectance characteristics of the antireflection coating film of this example. The lower graph in FIG. 3 is a graph in which a full scale of a vertical axis (reflectance) in the middle of FIG. 3 is enlarged from 5% to 1%. As is apparent from these graphs, high antireflection performances are delivered over the entire visible wavelength range (wavelengths from 400 to 700 nm). At incident angles of 0 to 45°, a reflectance of 0.3% or lower is achieved in the entire visible wavelength range. In addition, a reflectance of 1.8% or lower is achieved in the entire visible wavelength range even at an incident angle as large as 60°, and the reflectance at a wavelength of 550 nm is a value of 0.7% or lower. In this manner, the antireflection coating film of this example delivers superior antireflection characteristics.

In the invention, the method of manufacture is not specifically limited as long as the refractive index structure as described above is achieved. As the method of manufacturing the first layer 103, for example, a method of forming an organic resin material containing porous particles or hollow fine particles such as silica ($SiO_2$) or magnesium fluoride ($MgF_2$) or the like having a grain diameter of 1 to 40 nm by a spin coat method or the like may be employed. The refractive index of hollow silica fine particles formed of a material having a refractive index of 1.46 and porosity (the volume ratio of air) of 40% is 1.261 when calculating by using the Lorentz-Lorenz expression. The refractive index in a case where two mediums having different refractive indexes are uniformly mixed may be calculated by the same Lorentz-Lorenz expression;

$$(Neff^2-1)/(Neff^2+2)=f\!fa(Na^2-1)/(Na^2+2)+f\!fb(Nb^2-1)/(Nb^2+2)$$

where Neff is the effective refractive index of the medium after mixture, ffa and Na are the space filling factor (volume ratio) and the refractive index of one of the mediums respectively, and ffb, Nb are the space filling factor and the refractive index of the other medium respectively. Therefore, $$ffa+ffb=1$$

is satisfied.

Assuming that the refractive index of the organic resin material is 1.480 from these expressions, a refractive index of 1.360 is realized by setting a ratio of the organic resin and the hollow silica fine particles to 0.53:0.47. Any other methods are applicable as long as the layer having a film thickness of 26.0 nm may be formed at a refractive index of 1.360.

The second layer 104 and the third layer 105 are not specifically limited as well in the same manner as long as the above-described refractive index structure is realized. For example, when a method of applying a solution containing aluminum oxide ($Al_2O_3$), immersing a film formed after drying in warm water, and yielding a plate-shaped crystal on a surface thereof is used, the second layer 104 and the third layer 105 may be formed simultaneously. In this case, the plate-shaped crystal portion yielded from a layer containing the aluminum oxide corresponds to the third layer 105 and the porous layer containing aluminum oxide remaining in a base portion without being yielded corresponds to the second layer 104. With this method, the fine concavo-convex structure having pitches illustrated in FIG. 1 (the distance between adjacent protrusions) of 400 nm or smaller and a thickness (height) of 180 nm or larger may be manufactured easily. The refractive index structure (the way of change of the refractive index) may be controlled by setting the content of aluminum oxide or the type and the amount of a stabilizing agent or catalyst adequately, and the film thickness D3 may be controlled by setting coating conditions adequately.

Embodiments of a film coating method include given wet coating methods such as a dip coat method and a spin coat method. However, for an optical base member such as a lens having curvature, the spin coat method is preferable in terms of uniformity of the film thickness in a plane. In this case, given film thickness may be realized by adjusting the density of coating liquid, the number, and the duration of a spin rotation.

As the method of forming the second layer 104 and the third layer 105, the method forming the film containing aluminum oxide by a dry film forming method such as a vapor deposition method or a spattering method may be employed. In this case, control of the refractive index or the film thickness is achieved by controlling the film thickness or the porosity of the film.

Embodiment 2

Figure 4:
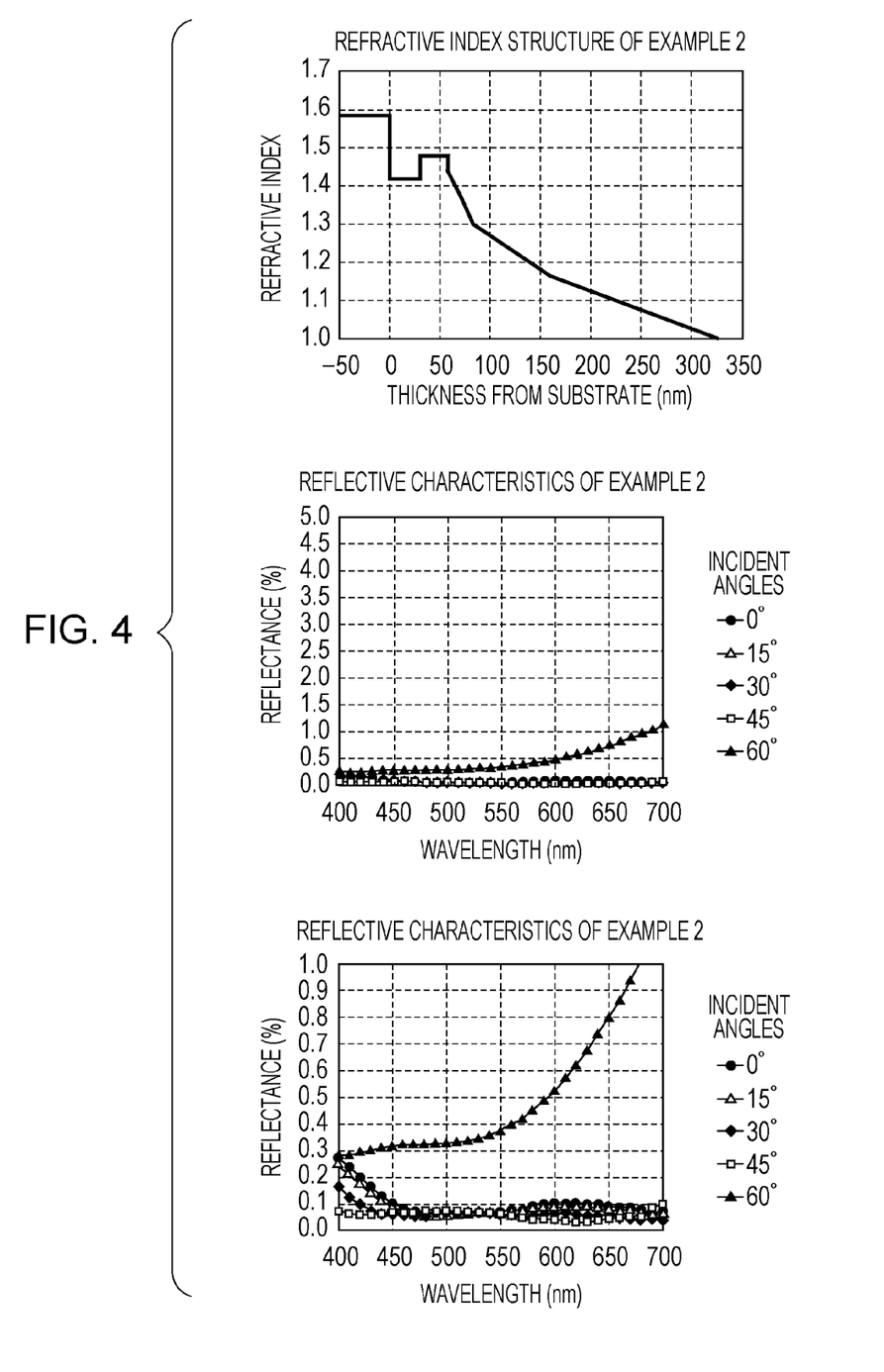
FIG. 4 illustrates the refractive index structure and reflectance characteristics of the antireflection coating film of Embodiment 2.

An upper graph in FIG. 4 illustrates a refractive index structure of the antireflection coating film of the invention. The refractive index Nsub of the optical base member 101 in this example is 1.585. The refractive index N1 of the first layer 103 is 1.415, and the film thickness D1 is 29.5 nm. The refractive index N2 of the second layer 104 is 1.475, and a film thickness D2 is 28.1 nm. The film thickness D3 of the third layer 105 is 267.8 nm, and the refractive index N3 changes continuously from 1.435 toward 1.0 in a profile illustrated in the upper graph in FIG. 4.

The middle graph in FIG. 4 and the lower graph in FIG. 4 illustrate reflectance characteristics of this example. As is apparent from these graphs, high antireflection performances are delivered over the entire visible wavelength range. At incident angles of 0 to 45°, a reflectance of 0.3% or lower is achieved in the entire visible wavelength range. In particular, at an incident angle of 45°, extremely high antireflection characteristics such as 0.1% or lower in the entire visible wavelength range are realized. In addition, a reflectance of 1.2% or lower is achieved in the entire visible wavelength range even at an incident angle as large as 60°, and the reflectance at a wavelength of 550 nm is a value of 0.4% or lower, which delivers superior antireflection characteristics.

The method of manufacturing of this example is not specifically limited as long as the above-described refractive index structure is achieved. As an example, the above-described refractive index structure is achieved by changing given conditions in the method described in Embodiment 1.

Embodiment 3

Figure 5:
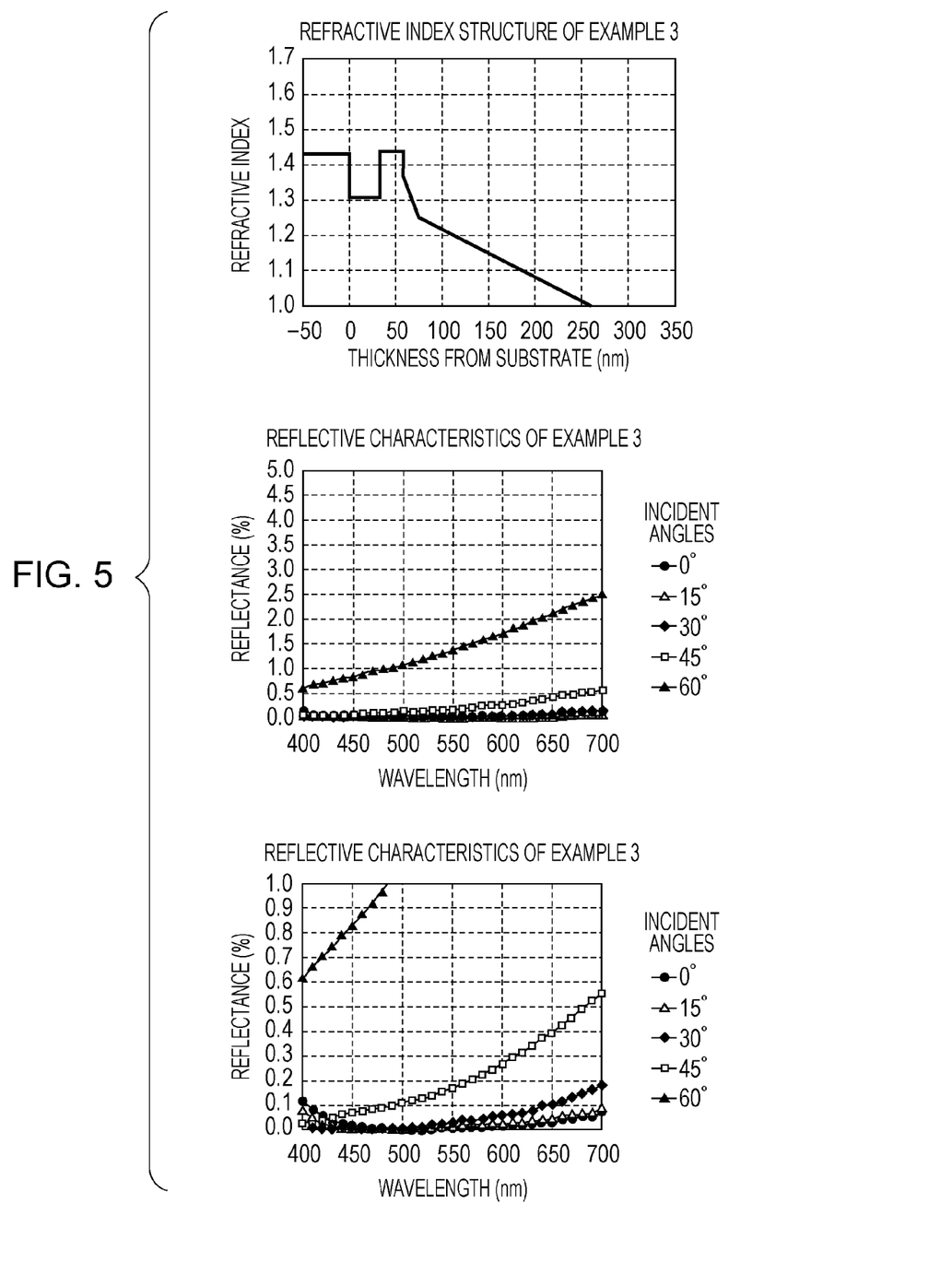
FIG. 5 illustrates the refractive index structure and reflectance characteristics of the antireflection coating film of Embodiment 3.

An upper graph in FIG. 5 illustrates a refractive index structure of the antireflection coating film of the invention. The refractive index Nsub of the optical base member 102 in this example is 1.435. The refractive index N1 of the first layer 103 is 1.310, and the film thickness D1 is 33.0 nm. The refractive index N2 of the second layer 104 is 1.443, and the film thickness D2 is 23.2 nm. The film thickness D3 of the third layer 105 is 207.7 nm, and the refractive index N3 changes continuously from 1.373 toward 1.0 in a profile illustrated in the uppermost graph in FIG. 5.

A middle graph in FIG. 5 and a lower graph in FIG. 5 illustrate the reflectance characteristics of this example. As is apparent from these graphs, high antireflection performances are delivered over the entire visible wavelength range. At the incident angles of 0 to 30°, a reflectance of 0.2% or lower is achieved in the entire visible wavelength range. In addition, a reflectance of 0.6% or lower is achieved in the entire visible wavelength range at an incident angle of 45°, and the reflectance at a wavelength of 550 nm is a value of 0.2% or lower. In addition, a reflectance of 2.5% or lower is achieved in the entire visible wavelength range even at an incident angle of 60°, and the reflectance at a wavelength of 550 nm is a value of 1.5% or lower, which delivers superior antireflection characteristics.

The method of manufacturing of this example is not specifically limited as long as the above-described refractive index structure is achieved. For example, the above-described refractive index structure is achieved by changing given conditions by applying the method described in Embodiment 1.

Embodiment 4

Figure 6:
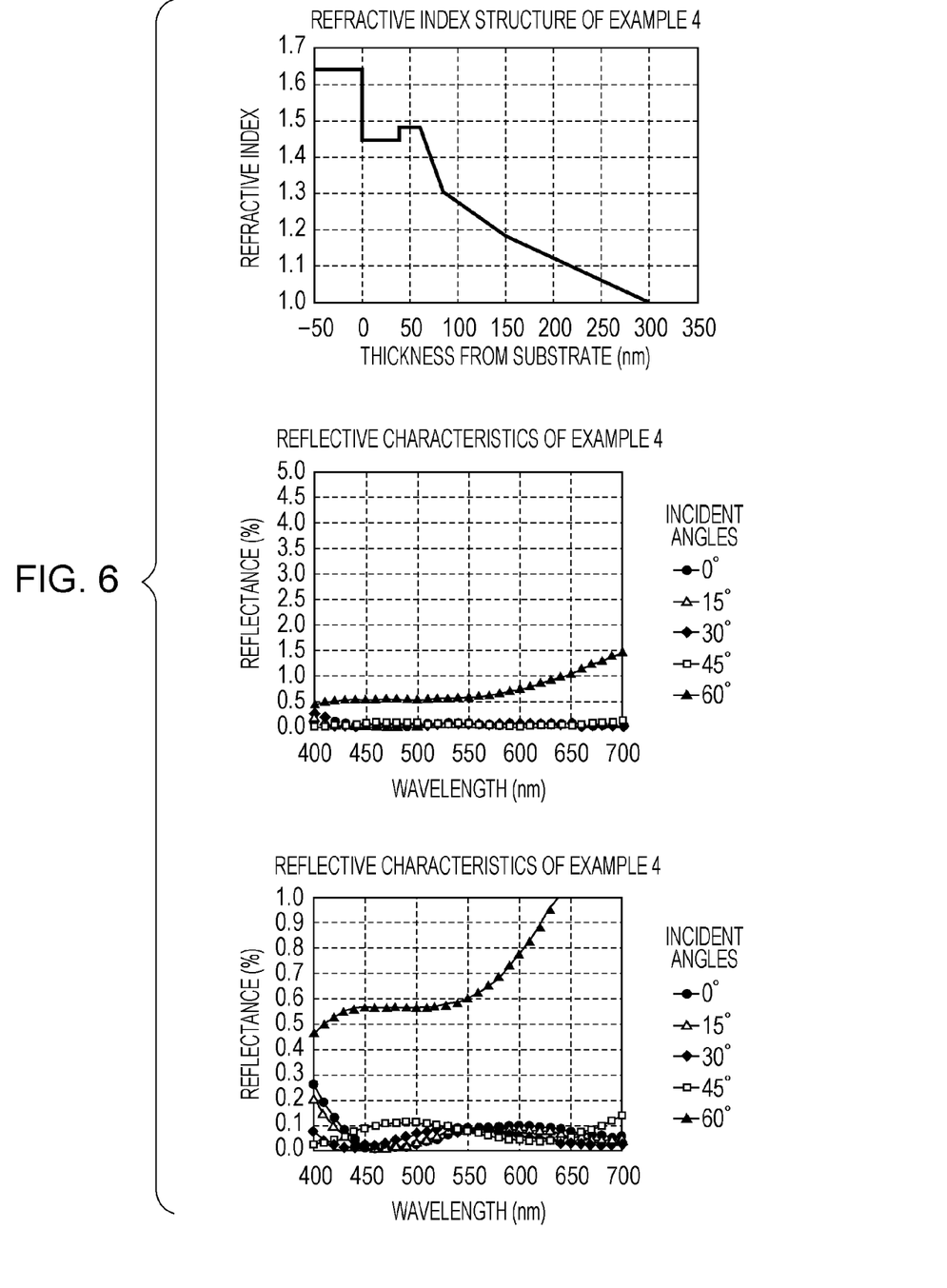
FIG. 6 illustrates the refractive index structure and reflectance characteristics of the antireflection coating film of Embodiment 4.

An upper graph in FIG. 6 illustrates a refractive index structure of the antireflection coating film of the invention. The refractive index Nsub of the optical base member 101 in this example is 1.644. The refractive index N1 of the first layer 103 is 1.450, and the film thickness D1 is 37.0 nm. The refractive index N2 of the second layer 104 is 1.480, and the film thickness D2 is 24.9 nm. The film thickness D3 of the third layer 105 is 238.7 nm, and the refractive index N3 changes continuously from 1.480 toward 1.0 in a profile illustrated in the uppermost graph in FIG. 6.

A middle graph in FIG. 6 and a lower graph in FIG. 6 illustrate reflectance characteristics of this example. As is apparent from these graphs, high antireflection performances are delivered over the entire visible wavelength range. At incident angles of 0 to 45°, a reflectance of 0.3% or lower is achieved in the entire visible wavelength range. In addition, a reflectance of 1.5% or lower is achieved in the entire visible wavelength range even at an incident angle of 60°, and the reflectance at a wavelength of 550 nm is a value on the order of 0.6%, which offers superior antireflection characteristics.

The method of manufacturing of this example is not specifically limited as long as the above-described refractive index structure is achieved. For example, the above-described refractive index structure is achieved by changing given conditions by applying the method described in Embodiment 1.

Embodiment 5

Figure 7:
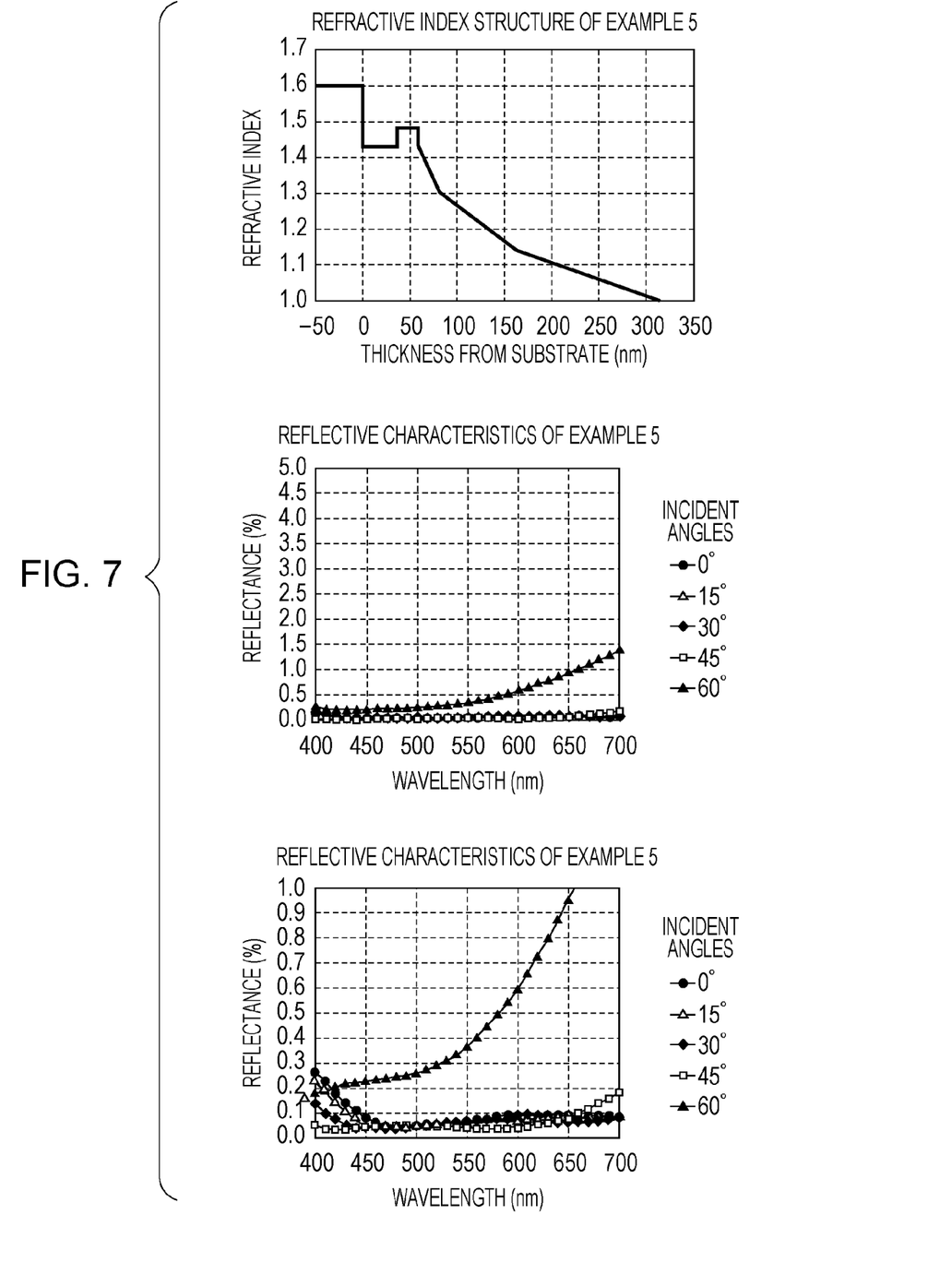
FIG. 7 illustrates the refractive index structure and reflectance characteristics of the antireflection coating film of Embodiment 5.

An upper graph in FIG. 7 illustrates a refractive index structure of the antireflection coating film of the invention. The refractive index Nsub of the optical base member 101 in this example is 1.603. The refractive index N1 of the first layer 103 is 1.430, and the film thickness D1 is 34.0 nm. The refractive index N2 of the second layer 104 is 1.480, and the film thickness D2 is 23.2 nm. The film thickness D3 of the third layer 105 is 262.0 nm, and the refractive index N3 changes continuously from 1.435 toward 1.0 in a profile illustrated in the uppermost graph in FIG. 7.

A middle graph in FIG. 7 and a lower graph in FIG. 7 illustrate reflectance characteristics of this example. As is apparent from these graphs, high antireflection performances are delivered over the entire visible wavelength range.

At incident angles of 0 to 45°, a reflectance of 0.3% or lower is achieved in the entire visible wavelength range. In addition, a reflectance of 1.4% or lower is achieved in the entire visible wavelength range even at an incident angle of 60°, and the reflectance at a wavelength of 550 nm is a value of 0.4% of lower, which offers superior antireflection characteristics.

The method of manufacturing of this example is not specifically limited as long as the above-described refractive index structure is achieved. For example, the above-described refractive index structure is achieved by changing given conditions by applying the method described in Embodiment 1.

As described above, the antireflection coating film of the invention needs to fulfill following conditions described below.

$$1.43 \leq N\text{sub} \leq 1.65 \quad (1)$$

$$1.30 \leq N1 \leq 1.50 \quad (2)$$

$$22\text{ nm} \leq D1 \leq 45\text{ nm} \quad (3)$$

$$1.42 \leq N2 \leq 1.52 \quad (4)$$

$$18\text{ nm} \leq D2 \leq 35\text{ nm} \quad (5)$$

$$1.35 \leq N3 \leq 1.52 \quad (6)$$

$$180\text{ nm} \leq D3 \leq 320\text{ nm} \quad (7)$$

$$N1 \leq N\text{sub} \quad (8)$$

$$N1 \leq N2 \quad (9)$$

$$N3 \leq N2 \quad (10)$$

Furthermore, fulfilling the following conditions is considered to be more preferable.

$$1.30 \leq N1 \leq 1.48 \quad (2a)$$

$$24\text{ nm} \leq D1 \leq 40\text{ nm} \quad (3a)$$

$$1.43 \leq N2 \leq 1.49 \quad (4a)$$

$$20\text{ nm} \leq D2 \leq 32\text{ nm} \quad (5a)$$

$$1.36 \leq N3 \leq 1.50 \quad (6a)$$

$$200\text{ nm} \leq D3 \leq 280\text{ nm} \quad (7a)$$

Subsequently, in order to clarify the effects of the invention, specifically, the effects obtained by determining numerical values, the reflectance characteristics in the case where being deviated from predetermined values will be shown as comparative examples.

Comparative Embodiment 1

Figure 8:
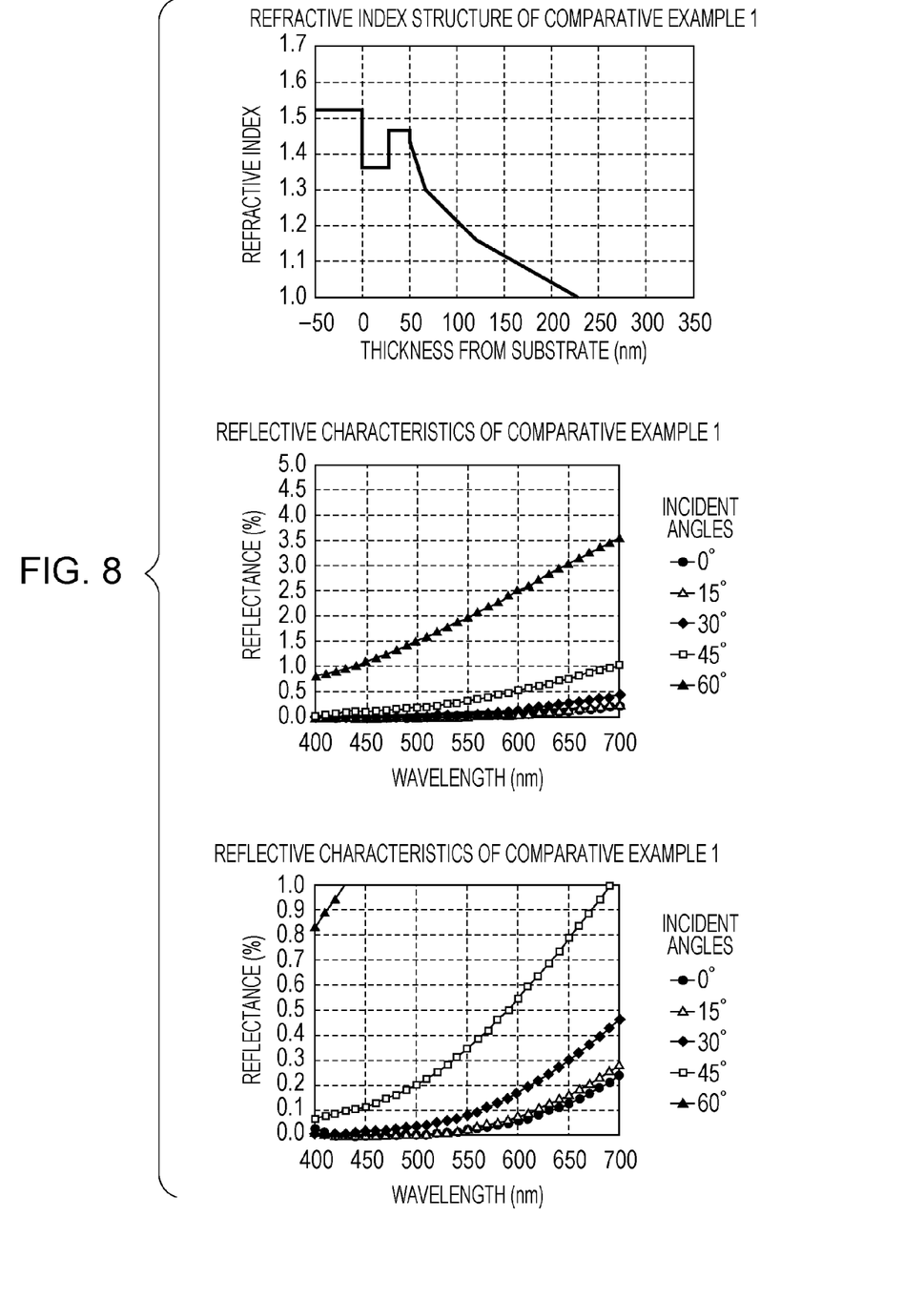
FIG. 8 illustrates the refractive index structure and reflectance characteristics of the antireflection coating film of Comparative Embodiment 1.

An upper graph in FIG. 8 illustrates a refractive index structure of an antireflection coating film of the Comparative Embodiment 1. In Comparative Embodiment, the film thickness D3 of the third layer 105 is deviated from the predetermined value in comparison with Embodiment 1, and the film thickness D3 of the third layer 105 is 178.5 nm.

A middle graph in FIG. 8 and a lower graph in FIG. 8 illustrate the reflectance characteristics of this comparative example. As apparent from these graphs, the reflectance characteristic of this comparative example is significantly deteriorated in comparison with Embodiment 1. Although improvement of the characteristics of a short wavelength side (a wavelength of 400 to 500 nm) at an incident angle of 0 to 30° is seen, a region of a wavelength of 550 nm or larger, or at incident angles of 45° and 60°, the reflectance is significantly increased. Therefore, when an optical element on which such an antireflection coating film is mounted is used in the optical system, there is a fear of generation of undesirable light (flare or ghost) of red or orange.

Comparative Embodiment 2

Figure 9:
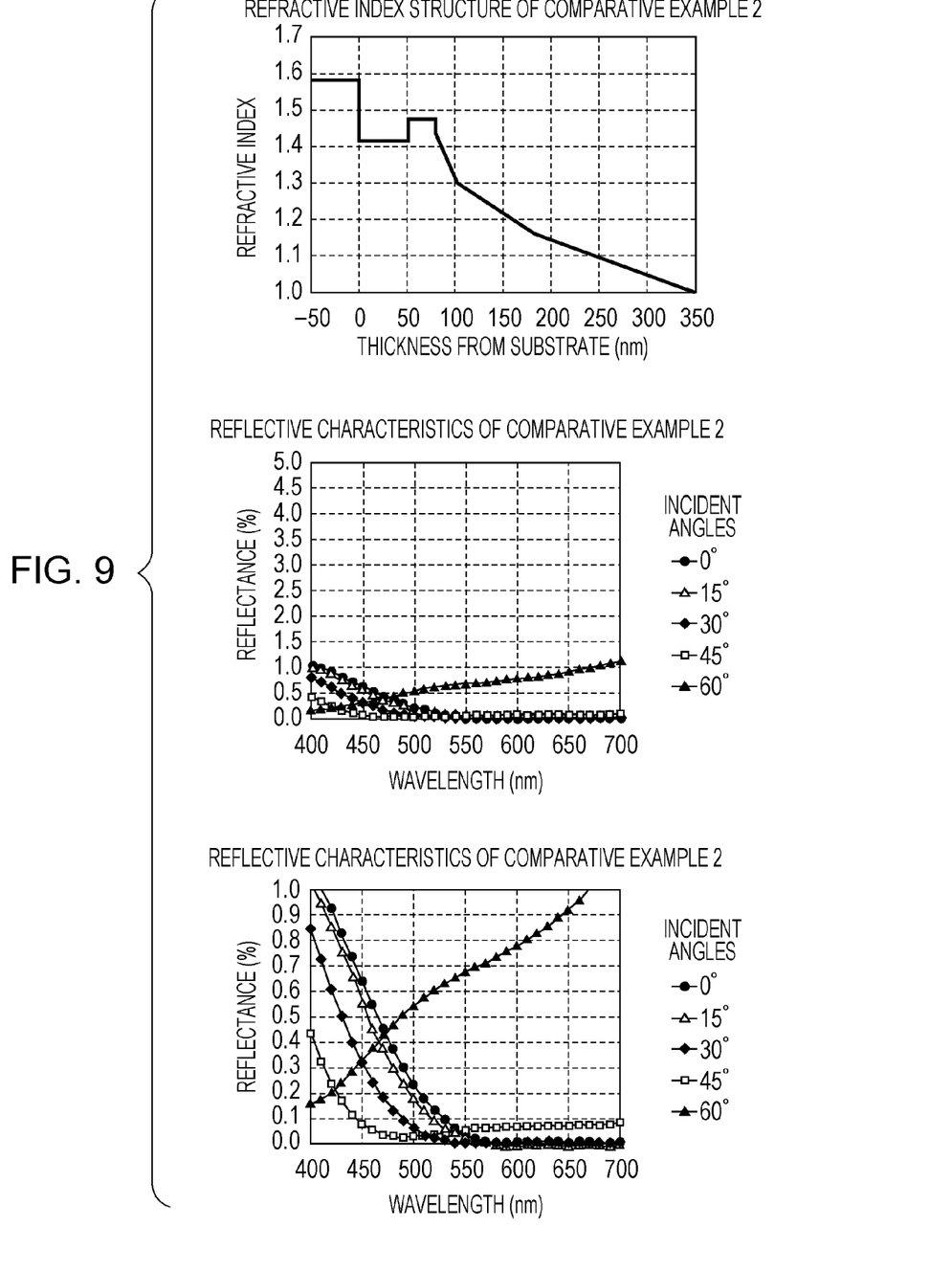
FIG. 9 illustrates the refractive index structure and reflectance characteristics of the antireflection coating film of Comparative Embodiment 2.

An upper graph in FIG. 9 illustrates a refractive index structure of the antireflection coating film of the Comparative Embodiment 2. In Comparative Embodiment, the film thickness D1 of the first layer 103 is deviated from the predetermined value in comparison with Embodiment 2, and the film thickness D1 of the first layer 103 is 52.0 nm.

A middle graph in FIG. 9 and a lower graph in FIG. 9 illustrate reflectance characteristics of this comparative example. As apparent from these graphs, the reflectance characteristic of this comparative example is significantly deteriorated in comparison with Embodiment 2. The reflectance of the short wavelength side at the incident angle of 0 to 45° is significantly increased. Therefore, when the optical element on which such an antireflection coating film is mounted is used in the optical system, there is a fear of generation of the undesirable light (flare or ghost) of blue.

Comparative Embodiment 3

Figure 10:
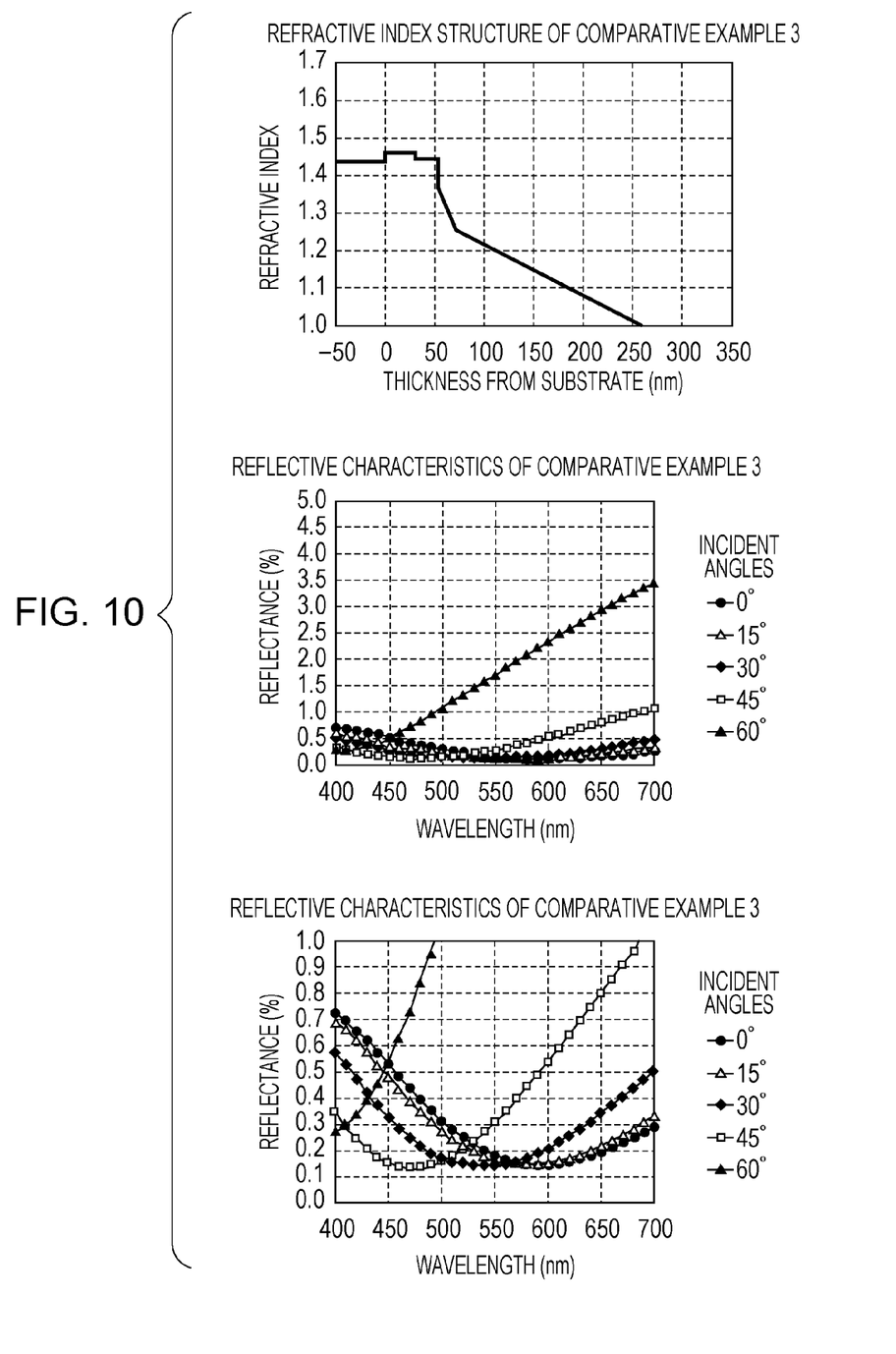
FIG. 10 illustrates the refractive index structure and reflectance characteristics of the antireflection coating film of Comparative Embodiment 3.

An upper graph in FIG. 10 illustrates a refractive index structure of the antireflection coating film of the Comparative Embodiment 3. Comparative Embodiment 3 is different from Embodiment 3 in the refractive index N1 and the film thickness D1 of the first layer 103. The refractive index N1 of the first layer 103 is 1.460, and the film thickness D1 is 30.0 nm. In other words, $$N1 > N\text{sub}$$

$$N1 > N2$$

are satisfied.

A middle graph in FIG. 10 and a lower graph in FIG. 10 illustrate antireflection characteristics of this comparative example. As apparent from these graphs, the reflectance characteristic of this comparative example is significantly deteriorated in comparison with Embodiment 3. The reflectance of the light rays at an incident angle of 0° is 0.2% or lower over the entire visible wavelength range in Embodiment 3. However, in this comparative example, the reflectance on the short wavelength side is 0.7%, and is 0.15% or higher in the vicinity of 580 nm at which the reflectance is the highest. Therefore, when an optical element on which such an antireflection coating film is mounted is used, there is a fear of generation of flare or ghost.

Embodiment of Application to Optical System

Figure 11:
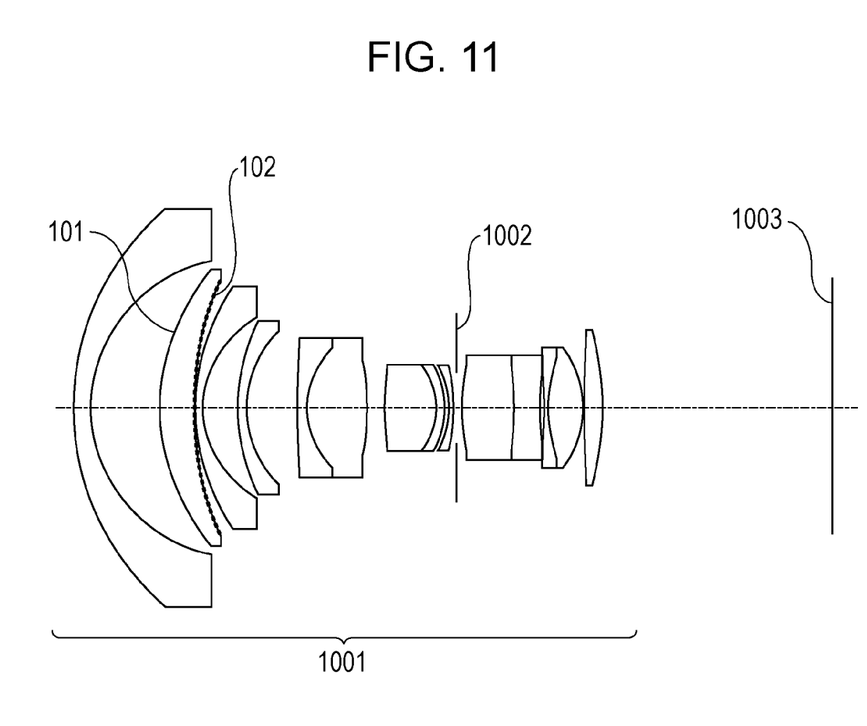
FIG. 11 is a cross-sectional view of a principal portion of an optical system to which the antireflection coating film of the invention is applied.

FIG. 11 is a cross-sectional view of a principal portion of the optical elements including the antireflection coating films of Embodiments 1 to 5 of the invention in a case of being applied to the optical system. Designed values of the lenses of this optical system are shown in Numerical Embodiment 1.

In FIG. 11, reference numeral 1001 denotes an optical system, and is a wide view angle lens for a camera having a focal length of 14 mm. Reference numeral 1002 denotes an aperture stop, and 1003 denotes an image-capturing element or a film. In this optical system, an antireflection coating film 102 of the invention is provided on an image side surface of the optical base member 101.

In this example of application, a case of the wide view angle lens for a camera is shown as an example of the optical system. However, the invention is not limited thereto, and standard lenses or telephoto lenses having a long focal distance may be employed and, in addition, observation optical systems such as binoculars are also applicable.

Furthermore, by using the optical system using the antireflection coating film of the invention in an optical apparatus such as a digital camera, harmful light such as flare or ghost may be reduced, and higher-quality images may be obtained.

TABLE

|  | Nsub | N1 | D1 | N2 | D2 | N3 | D3 |
|---|---|---|---|---|---|---|---|
| EMBODIMENT 1 | 1.518 | 1.360 | 26.0 | 1.464 | 24.4 | 1.444 | 248.4 |
| EMBODIMENT 2 | 1.585 | 1.415 | 29.5 | 1.475 | 28.1 | 1.435 | 267.8 |
| EMBODIMENT 3 | 1.435 | 1.310 | 33.0 | 1.443 | 23.2 | 1.373 | 207.7 |
| EMBODIMENT 4 | 1.644 | 1.450 | 37.0 | 1.480 | 24.9 | 1.480 | 238.7 |
| EMBODIMENT 5 | 1.603 | 1.430 | 34.0 | 1.480 | 23.2 | 1.435 | 262.0 |
| COMPARATIVE EMBODIMENT 1 | 1.518 | 1.360 | 26.0 | 1.464 | 24.4 | 1.444 | 178.5 |
| COMPARATIVE EMBODIMENT 2 | 1.585 | 1.415 | 52.0 | 1.475 | 28.1 | 1.435 | 267.8 |
| COMPARATIVE EMBODIMENT 3 | 1.435 | 1.460 | 30.0 | 1.443 | 23.2 | 1.373 | 207.7 |

Numerical Embodiment 1
unit mm
surface data
surface No.
Object Surface

| 1 | 43.611 | 3.10 | 1.69680 | 55.5 |
|---|---|---|---|---|
| 2 | 26.108 | 11.30 |  |  |
| 3 | 58.696 | 5.83 | 1.60311 | 60.7 |
| 4 | 52.318 | 0.15 |  |  |
| 5 | 36.653 | 1.70 | 1.69680 | 55.5 |
| 6 | 17.777 | 6.39 |  |  |
| 7 | 48.633 | 1.30 | 1.77250 | 49.6 |
| 8 | 20.569 | 8.24 |  |  |
| 9 | 260.012 | 1.50 | 1.69680 | 55.5 |
| 10 | 15.580 | 10.11 | 1.59551 | 39.2 |
| 11 | −50.458 | 3.24 |  |  |
| 12 | 54.936 | 8.21 | 1.56732 | 42.8 |
| 13 | −10.586 | 1.50 | 1.77250 | 49.6 |
| 14 | −14.355 | 0.82 |  |  |
| 15 | −14.991 | 0.90 | 1.77250 | 49.6 |
| 16 | −42.782 | 0.50 |  |  |
| 17 | (aperture) | 1.40 |  |  |
| 18 | 84.663 | 8.63 | 1.60311 | 60.7 |
| 19 | −69.334 | 4.00 | 1.74320 | 49.3 |
| 20 | 78.755 | 0.67 |  |  |
| 21 | −180.599 | 0.80 | 1.92286 | 21.3 |
| 22 | 32.151 | 5.88 | 1.48749 | 70.2 |
| 23 | −18.364 | 0.15 |  |  |
| 24 | 352.989 | 3.30 | 1.80400 | 46.6 |
| 25 | −38.634 |  |  |  |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-132760, filed on Jun. 12, 2012, which is hereby incorporated by reference herein in its entirety.

What is claimed is:

1. An antireflection coating film formed on an optical base member comprising:
   a first layer having a refractive index of N1 and a film thickness of D1;
   a second layer having a refractive index of N2 and a film thickness of D2; and
   a third layer formed of a fine concavo-convex structure, having a refractive index changing from N3 to 1.0, and a film thickness of D3,
   wherein the first, second, and third layer are formed in order from the optical base member side having a refractive index of Nsub, and
   wherein when the refractive indices Nsub, N1, N2, and N3 are those taken for a light having a wavelength of 550 nm, the following conditions are satisfied;

$1.43 \leq Nsub \leq 1.65$ $1.30 \leq N1 \leq 1.50$ $22 nm \leq D1 \leq 45 nm$ $1.42 \leq N2 \leq 1.52$ $18 nm \leq D2 \leq 35 nm$ $1.35 \leq N3 \leq 1.52$ $180 nm \leq D3 \leq 320 nm$ $N1 < Nsub$ $N1 < N2$ $N3 \leq N2$.

2. The antireflection coating film according to claim 1, where the following conditions are further satisfied:

$1.30 \leq N1 \leq 1.48$ $24 nm \leq D1 \leq 40 nm$ $1.43 \leq N2 \leq 1.49$ $20 nm \leq D2 \leq 32 nm$ $1.36 \leq N3 \leq 1.50$ $200 nm \leq D3 \leq 280 nm$.

3. The antireflection coating film according to claim 1, wherein the first layer includes an organic resin material.

4. The antireflection coating film according to claim 1, wherein the first layer includes porous particles or hollow particles including silica ($SiO_2$) or magnesium fluoride ($MgF_2$) having grain diameters of 1 to 40 nm.

5. The antireflection coating film according to claim 1, wherein the second layer is a layer including aluminum oxide.

6. The antireflection coating film according to claim 1, wherein the third layer is a fine concavo-convex structure configured by containing aluminum oxide.

7. The antireflection coating film according to claim 1, wherein the fine concavo-convex structure of the third layer has a plurality of protrusions, and wherein a distance between adjacent protrusions is 400 nm or smaller.

8. The antireflection coating film according to claim 1, wherein the first layer includes an organic resin material having porous particles or hollow particles including silica (SiO2) or magnesium fluoride (MgF2) having grain diameters of 1 to 40 nm, wherein the second layer is a layer including aluminum oxide, and wherein the third layer is a fine concavo-convex structure containing aluminum oxide.

9. The antireflection coating film according to claim 1, wherein when a refractive index of a center part in a film thickness direction of the third layer is Nc, and N3-Nc=ΔNa, and Nc-1=ΔNb, the following condition is satisfied;

ΔNa>ΔNb.

10. The antireflection coating film according to claim 1, wherein the third layer including, in order from the optical base member side, a first region having a film thickness of D31 and a refractive index change rate average R1, a second region having a film thickness of D32 and a refractive index change rate average R2, and a third region having a film thickness of D33 and a refractive index change rate average R3, the following conditions are satisfied;

D31<D32<D33

R1>R2>R3.

11. The antireflection coating film according to claim 10, wherein the following condition is satisfied;

D31+D32+D33=D3.

12. The antireflection coating film according to claim 1, wherein, in a wavelength range having wavelengths from 400 to 700 nm, a reflectance with respect to a light incident at incident angles of 0 to 45° is 0.6% or lower, and a reflectance with respect to a light incident at incident angle of 60° is 2.5% or lower.

13. The antireflection coating film according to claim 1, wherein, in a wavelength range having wavelengths from 400 to 700 nm, a reflectance with respect to a light incident at incident angles of 0 to 45° is 0.3% or lower, and a reflectance with respect to a light incident at incident angle of 60° is 1.8% or lower.

14. The antireflection coating film according to claim 1, wherein the following condition is satisfied;

207.7nm≤D3≤267.8nm.

15. The antireflection coating film according to claim 1, wherein the following condition is satisfied;

0.030≤N2−N1≤0.133.

16. The antireflection coating film according to claim 1, wherein the following condition is satisfied;

0.125≤Nsub−N1≤0.194.

17. The antireflection coating film according to claim 1, wherein the optical base member and the first layer adhere with each other.

18. An optical element comprising:
an optical base member having a refractive index of Nsub;
an antireflection coating film including, in order from the optical base member side, a first layer having a refractive index of N1 and a film thickness of D1, a second layer having a refractive index N2 and a film thickness D2, and a third layer formed of a fine concavo-convex structure, having a refractive index changing from N3 to 1.0, and a film thickness of D3, wherein when the refractive indices Nsub, N1, N2, and N3 are those taken for a light having a wavelength of 550 nm, the following conditions are satisfied;

1.43≤Nsub≤1.65

1.30≤N1≤1.50

22nm≤D1≤45 nm 1.42≤N2≤1.52

18 nm≤D2≤35 nm 1.35≤N3≤1.52

180 nm≤D3≤320 nm

N1<Nsub

N1<N2

N3≤N2.

19. An optical system comprising:
an optical element including:
an optical base member having a refractive index of Nsub;
an antireflection coating film including, in order from the optical base member side, a first layer having a refractive index of N1 and a film thickness of D1, a second layer having a refractive index of N2 and a film thickness of D2, and a third layer formed of a fine concavo-convex structure, having a refractive index changing from N3 to 1.0, and a film thickness of D3, wherein the optical element satisfies the following conditions when the refractive indices Nsub, N1, N2, and N3 are those taken for a light having a wavelength of 550 nm;

1.43≤Nsub≤1.65

1.30≤N1≤1.50

22nm≤D1≤45 nm 1.42≤N2≤1.52

18 nm≤D2≤35 nm 1.35≤N3≤1.52

180 nm≤D3≤320 nm

N1<Nsub

N1<N2

N3≤N2.

* * * * *